Figure 1:
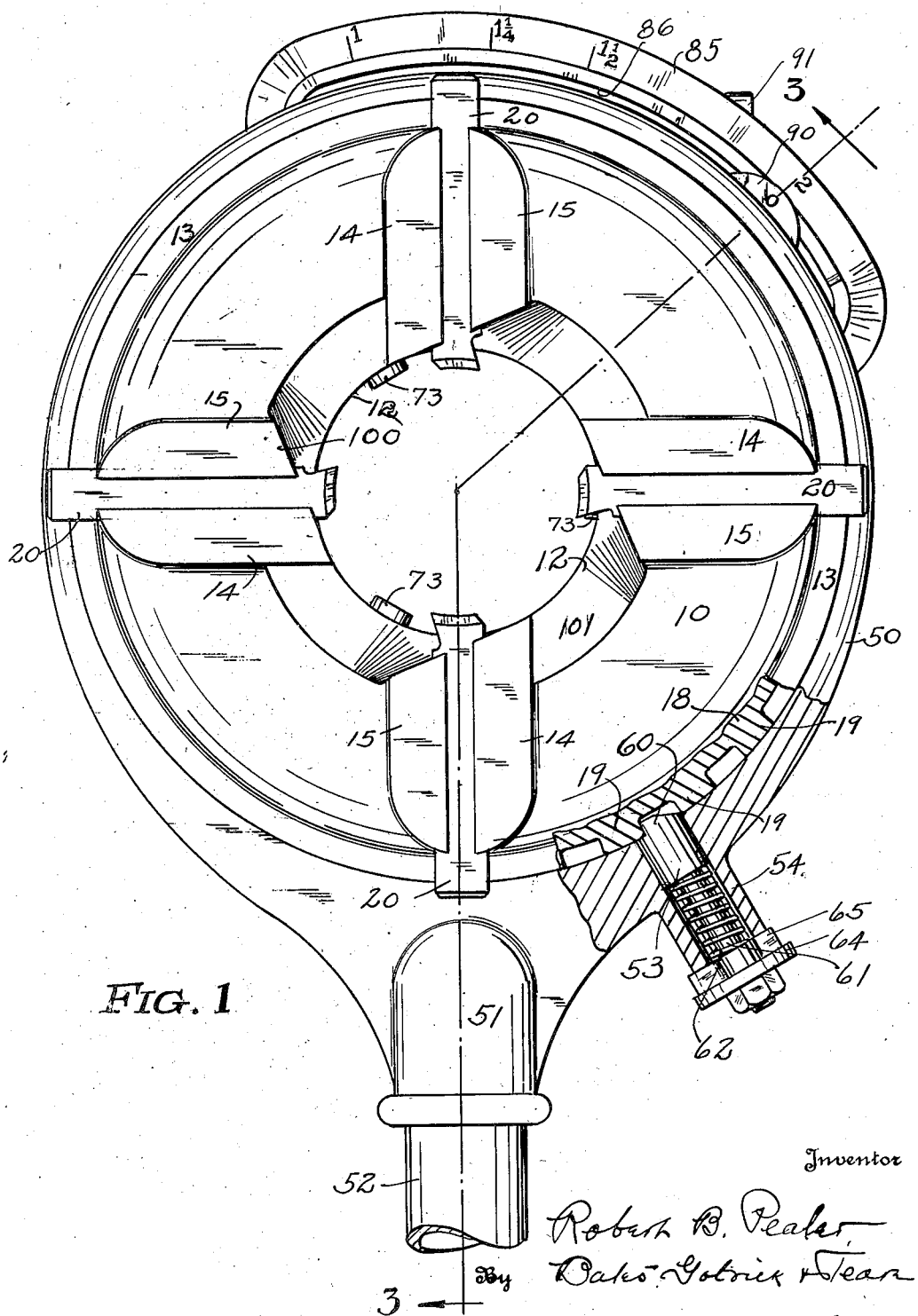

April 30, 1935.   R. B. PEALER   1,999,207
DIESTOCK
Filed Dec. 1, 1931   4 Sheets-Sheet 1

April 30, 1935.   R. B. PEALER   1,999,207
DIESTOCK
Filed Dec. 1, 1931   4 Sheets-Sheet 2

Inventor
Robert B. Pealer
By Bakes, Golrick & Gear
Attorneys

April 30, 1935.    R. B. PEALER    1,999,207
DIESTOCK
Filed Dec. 1, 1931    4 Sheets-Sheet 4

Inventor
Robert B. Pealer
By Bates, Golrick & Jean
Attorneys

Patented Apr. 30, 1935

1,999,207

UNITED STATES PATENT OFFICE 1,999,207

DIESTOCK

Robert B. Pealer, Warren, Ohio, assignor to The Borden Company, Warren, Ohio, a corporation of Ohio Application December 1, 1931, Serial No. 578,308

10 Claims. (Cl. 10—120.5)

This invention relates to a die stock of the receding chaser type, settable for different size work, and having a lead-screw connection with a work holder. The general object of the invention is to provide such a tool in the form which shall possess great strength and rigidity and at the same time be of comparatively light weight; which shall be accurate and efficient in operation, and adapted for economical manufacture.

Among the more particular objects of the invention is the provision of means for carrying the chasers slidably in permanent housing and in position substantially at the extreme end of the die stock so that the chasers will always be accurately held and may be very readily oiled and the chips effectively discharged. These chaser housings are permanent integral portions of the die head open from end to end, so that they may be readily machined by broaching. Their inner ends are formed so as to give ample chip clearance.

Another object of my invention is to provide a ratchet drive which shall act directly on the head, rather than through a recession controlling post, and still shall not in any way interfere with the open ended housings for the chasers. I effect this by providing an annular flange on the head, longitudinally beyond the chaser region, which carries teeth on its exterior engaged by a pawl carried by a surrounding driving strap.

The chasers are adjustable in the head by a settable cam ring carried by the head between its lead-screw sleeve and its toothed driving flange and having a pin extending through a slot in a rotatable ring carried by the work holder, and I have so devised the latter ring that indications thereon may be conveniently observed by the operator whether the die stock is horizontal on its pipe or is resting in vertical position on a bench.

I provide a plurality of chaser-controlling posts of rigid form, permanently secured in equidistant relation to the cam. These posts operate to shift the cam gradually during the threading operation without any danger of binding.

My invention comprises a die stock embodying the features above referred to, and others which will become apparent from the following more detailed description of a preferred embodiment shown in the drawings.

Figures 2, 7:
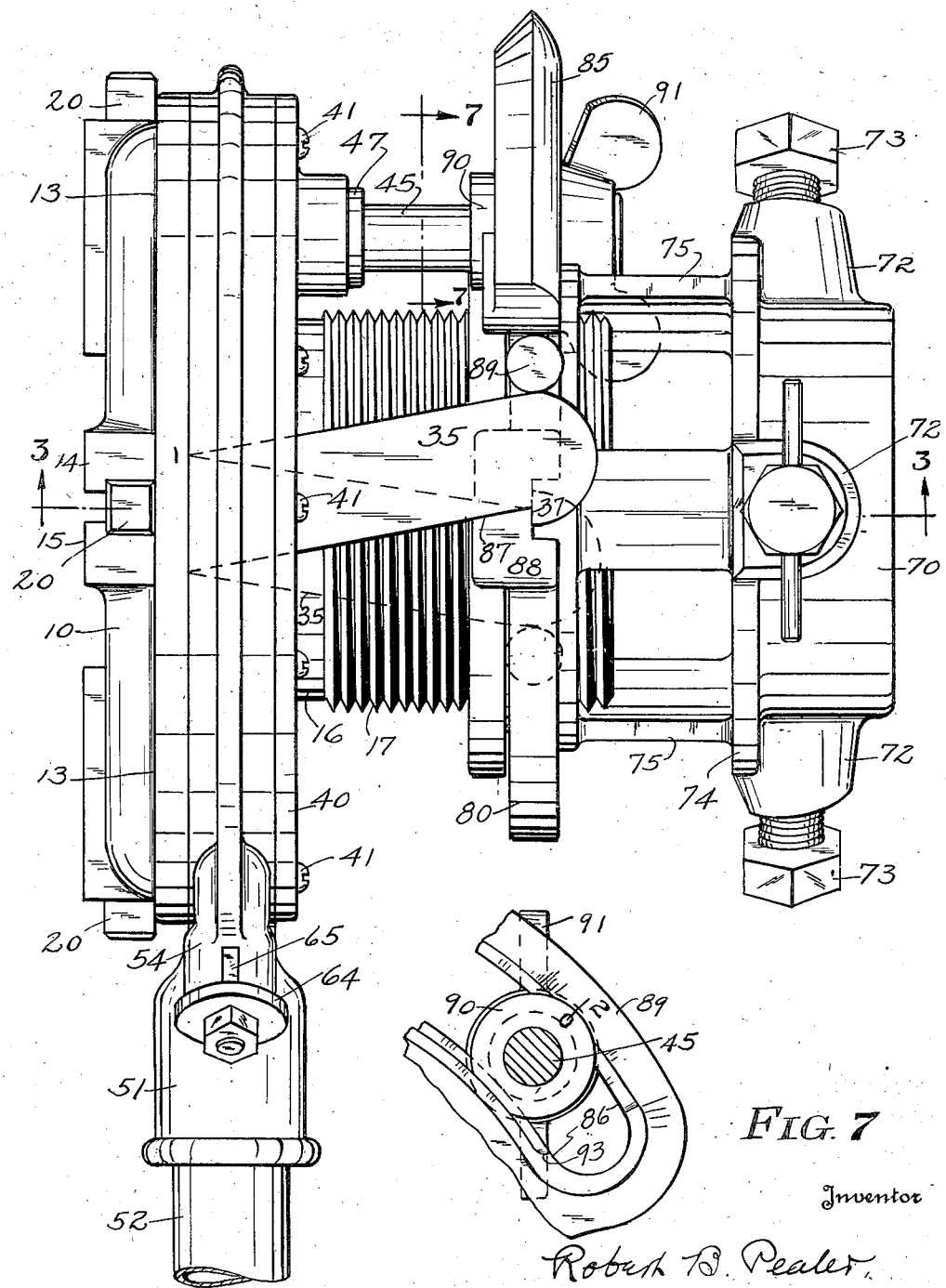
Figure 3:
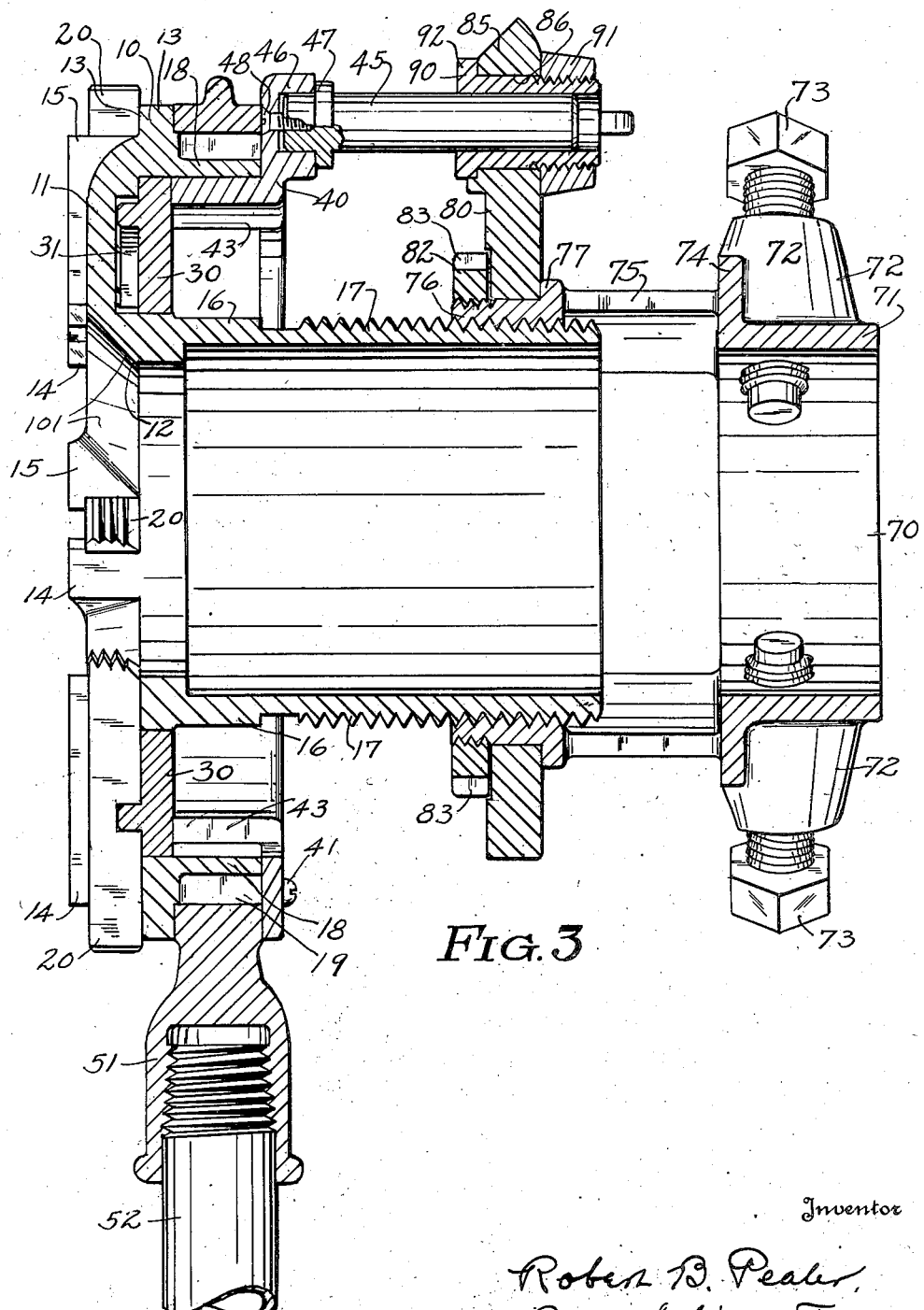
Figure 4:
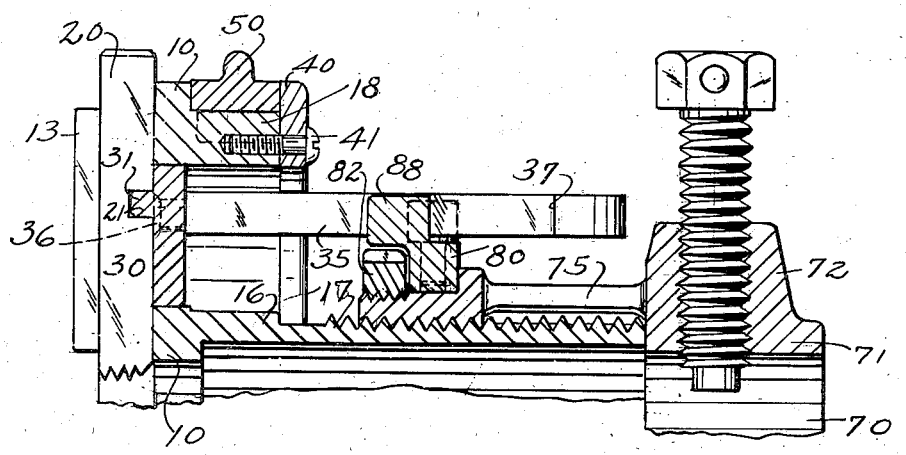
Figure 6:
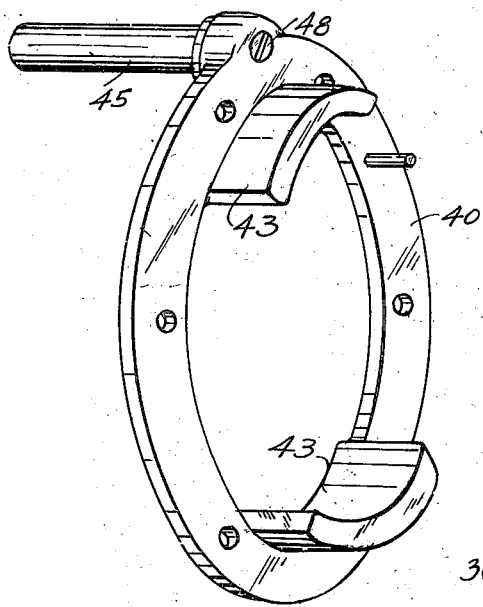
Figure 5:
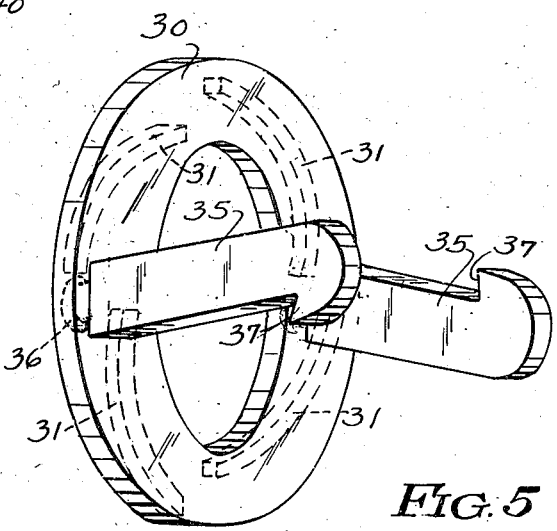

In the drawings, Fig. 1 is a face view of the die stock, partly broken away and sectioned; Fig. 2 is a side elevation; Fig. 3 is an axial section of the die stock taken on an offset plane indicated by the line 3—3 on Figs. 1 and 2; Fig. 4 is a fragmentary section on a radial plane adjacent the edge of one of the recession controlling posts; Fig. 5 is a perspective of the cam ring and the recession controlling posts carried thereby; Fig. 6 is a perspective of the locking ring which retains the cam ring and the ratchet driving strap in place; Fig. 7 is a detail illustrating the means of locating the pin which extends from the locking ring into a selected region of the recession-controlling ring on the work holder.

The chaser carrying head comprises a rigid, annular plate-like member 10 thickened at 11 between its inner periphery 12 and an outer flat marginal portion 13, and carrying, on its outer raised face, pairs of overhanging ribs 14 and 15 which, with the portion of the head in the same plane as the margin 13, make the chaser housings. The plate portion has, projecting from its face opposite the housings, a sleeve 16 externally threaded at 17 constituting the lead screw. Some distance outside of this sleeve the head has a depending annular flange 18 formed on its exterior with teeth 19 adapted to receive the pawl of the ratchet strap whereby the head is rotated.

The chasers 20 are long blocks, rectangular in cross section, and lie in radial position within their respective housings, being accurately engaged on opposite sides by the walls of the ribs 14 and 15 and on the outer face by the overhanging portions of those ribs (see Fig. 2), and on the inner face by the plate 10 and the cam ring to be described. The chasers are slidable radially in the housings, but are incapable of any other movement.

The cam ring 30 is mounted in the annular space between the sleeve 16 and the flange 18 and rests against the back of the face of the plate 10 and crosses the base of the chaser housings, the outer face of the cam ring being flush with the portion of the plate 10 at the base of the housings, as illustrated in Figs. 3 and 4. Each chaser has a notch 21 made in its inner face, which is occupied by the scroll rib 31 of the cam ring.

The cam ring is retained in place by a locking ring 40 which is an annular member secured by screws 41 to the head flange 18 and has a pair of arc-shaped wings 43 abutting the cam ring 30 and holding it in position. This same locking ring 40 at its outer periphery overhangs the strap 50 of the driving device and holds it in place. This strap is provided with a socket 51 to receive an operating handle 52. It also has a suitable pawl 60 adapted to engage the teeth 19 of the head, so that the oscillation of the handle will turn the chaser frame step-by-step.

The pawl 60 is shown in Fig. 1 as mounted radially in a hollow boss 54 formed on the ring and is pressed inward by a spring 62, surrounding the shank 61 of the pawl, to present a radial shoulder to the tooth 19 in front thereof and a beveled surface to the tooth at the rear. The pawl shank has a head 64 with a diametric blade 65 on its inner face which normally occupies diametric notches in the boss 54. When the head is pulled outwardly and given a half rotation, the pawl faces in an opposite direction, so that oscillation of the handle will give a reverse feed to the chaser frame; or, if the pawl head is given a less rotation than one-half, the blade will rest on the extreme end of the boss and hold the pawl in idle position.

The arrangement just described of the ratchet strap mounted on the head itself close to the chasers provides for a very direct driving action of the tool, doing away with internal strains or any tendency of the parts to spring in use.

The work holder 70 constituting part of the die stock comprises an annular sleeve 71 having three bosses 72 located 120° apart, and carrying clamping screws to engage the pipe to be threaded. Extending from the sleeve 71 as an annular flange 74 carrying longitudinal arms 75 which terminate in an internally threaded ring portion 76 into which the lead screw 17 is threaded.

Rotatably mounted on the work holder is the recession controlling ring 80. This surrounds the portion 76 of the work holder and rests against a shoulder 77 thereon and is locked in place by the ring nut 82 provided with suitable wrench notches 83 in its periphery. The ring 80 has an arcuate concentric projecting portion 85 extending for about a quarter of a circumference and provided with an arcuate slot 86. Occupying this slot is a bushing 90 held in selected position by a wing nut 91 screwing onto a thread on the bushing. The locking ring 40, rigid with the die head, carries a longitudinal pin 45 which slidably occupies the bushing 90, so that the die head and recession-controlling ring are compelled to rotate together though the die head approaches the ring or recedes from it in such travel.

The pin 45 is shown as extending into a hollow boss 46 formed on the locking ring and having a shoulder 47 abutting the boss and being locked by a screw 48 passing through the ring into the end of the pin. The pin is thus rigidly secured to the ring, and the ring, as heretofore explained, is rigidly secured to the head. The position of the cam ring 30 has a definite relation to the ring 80, as hereinafter explained, and accordingly the changing of the position of the bushing in the slot 86 changes the position of the cam relative to the head and thereby sets the chasers for different sizes of pipe.

The relation of the cam 30 to the recession-controlling ring 80 is controlled by a pair of inclined posts 35 rigidly secured to the cam ring 30 in diametrically opposite positions and extending through openings in the recession controlling ring 80. These posts are shown in Figs. 4 and 5 as having reduced shanks 36 passing into the cam ring and upset therein. The posts extend diagonally in opposite directions and each engages on one edge an inclined shoulder 87 provided by a boss 88 on the recession controlling ring 80 and on the other edge bears against a removable stud 89 secured to the ring. The posts are thus fixed against rotating movement independent of the ring 80, but may slide longitudinally through that ring, and in doing so their inclined edges necessarily shift the cam ring 30. As the ring 80 is locked to the chaser carrying head by the bushing 90, pin 45, and locking ring 40, it follows that in the operation of the tool the cam ring will be gradually rotated relative to the ring 80 and chaser-carrying head, as the threaded sleeve 16 screws into the work holder thread, and will thus withdraw the chasers.

The described connection is also availed of in the original setting of the chasers for the different sizes of pipe. By loosening the wing nut 91, the bushing 90 is freed from the recession controlling ring 80 and the latter may be shifted with reference to the head and this shifting turns the cam ring to vary the position of the chasers. The position of the chasers is indicated by suitable markings on the surface of the extension 85 as shown in Fig. 1. By making the face of this extension at an angle of about 45°, these marks indicating the different sizes of pipe may be readily observed whether the die stock is in use in horizontal position or is standing with its axis vertical.

When in use, after the die stock has been set and the work holder clamped to the pipe, the chaser head is rotated, by the back and forth movement of the handle 52, and in this operation the lead screw 17 passes into the threaded portion of the work holder. This causes the diagonal posts 35 to pass gradually across the inclined faces 87 on the recession controlling ring and thereby gradually shift the cam ring with reference to the head so that the chasers are gradually receded to cut a tapered thread. The limit of the inward movement is attained when the inner end of the sleeve 16 abuts the ledge 74 formed on the work holder sleeve 71. The outward movement has a limit by reason of hooked ends 37 on the recession posts engaging the far face of the boss 88 on the recession-controlling ring.

The die stock may be taken apart by removing the two studs 89. This allows the recession posts and cam ring to be shifted so that the hooks 37 will clear the bosses 88, enabling the head to be entirely removed from the work holder.

The bushing 90 has a normal range of movement corresponding to the different sizes of pipe to be threaded, as illustrated for instance by the 1", 1¼", 1½" and 2" sizes. However, an abnormal loosening of the wing nut 91 allows the bushing to move beyond the extreme size, indicated as 2", by reason of the head 92 on the bushing now riding up on a raised surface 93 (Fig. 7) at the end of the slot. This position carries the scroll ribs 31 entirely out of the chaser notches 21, and thereby frees the chasers so that they may be removed from their housings. This condition will not occur inadvertently because the ordinary loosening of the wing nut 91 will not allow the bushing to move far enough to cause the cam to free the chasers.

It will be seen that my die stock, as above described, is comparatively simple in construction and may be made in light form, and at the same time it is exceptionally rigid. The driving is direct on the chaser head instead of through the recession posts. The chasers are carried in rigidly permanent housings which cannot become misplaced, and the chasers are at the extreme end of the die stock where they are readily inspected and oiled. The housing ribs 14 and 15, at their inner ends, are cut off diagonally as shown at 100 in Fig. 1, and the thickened portion 10 of the head is beveled outwardly between these housings as shown at 101, and thus an unusually large chip clearance is provided in front of the cutting edge of each chaser.

In addition to the characteristics of strength, lightness and ease of operation, I may call attention to the following special features of advantage,—namely:

1. The permanent housings for the chasers.
2. The chasers located at the extreme end of the die stock.
3. The bevel on the inner periphery of the head associated with the cut-off ends of the housings providing effective chip clearance.
4. Direct driving on the chaser carrying head.
5. The ratchet teeth out of line with the die slots, which slots extend freely from end to end and may readily be made by broaching.
6. The driving strap housed independently of the cam plate but held by the same locking ring.
7. The use of dual posts, whereby skewing of the parts is prevented, these posts and the cam being effectively located by the rigid boss and the stud on the recession-controlling ring.
8. The suitable limits provided to the threading movement by the offset on the work holder frame and hooks on the recession posts.
9. The indication bar on the controlling ring beveled to provide for ready inspection, and having a shoulder preventing inadvertent separation of the parts.

I claim:

1. In a die stock, the combination of a head having chaser housings and having an annular flange, chasers in the housings, a cam ring coacting with the chasers and mounted on one side of said flange, a ratchet driving ring on the opposite side of said flange, and a locking ring secured to the flange and overlapping both the cam ring and the ratchet ring.

2. In a die stock of the character described, the combination of a rotary frame having a screw sleeve, a flange concentric of the sleeve and surrounding it some distance outside of it, a cam ring between the sleeve and flange, the flange having teeth on its outer periphery, a driving ring embracing said teeth and having a pawl to coact therewith, a locking ring secured to the flange overlaping the ratchet ring on the outside and having wings bearing against the cam ring on the inner side, and chasers occupying housings on the frame and having shoulders engaging the cam ring.

3. In a die stock of the character described, the combination of a work holder having a threaded sleeve, a chaser frame having a plate-like head and a threaded sleeve engaging the sleeve of the work holder and having a concentric flange some distance outside of the threaded sleeve, said frame having chaser housings on its face opposite the sleeves, the base of the housing chamber being open opposite the annular space between the sleeve and flange, a cam occupying said annular space and having scroll ribs engaging notches in the chasers, said flange having teeth on its exterior, an operating ring surrounding such teeth and having a pawl to engage them, a locking ring secured to the flange and overlapping both the cam ring and the ratchet driving ring, a longitudinal pin carried by the locking ring, a ring rotatably mounted on the work holder and having an arcuate slot a bushing adjustably mounted in said slot and slidably receiving said pin, and a slidable inclined connection between the ring and chaser carrying frame.

4. In a die stock, the combination of a work holder, a chaser frame, a cam mounted on the frame having a rigidly held post with an inclined edge, a rotatable ring on the work holder, said ring having a fixed shoulder engaging one edge of the post, a projection on that edge of the post, and a removable member engaging the opposite edge of the post to maintain it so that the projection overlies the fixed shoulder, whereby the structure is normally retained as a unit but may be separated when the removable member has been removed.

5. In a die stock, the combination of a work holder, a chaser carrying frame having a threaded connection with the work holder, a cam ring for controlling the chasers, said ring being mounted on the chaser carrying frame and having an inclined post rigidly carried thereby and having a cross section which is oblong in the direction of rotation, a ring on the work holder having a recess occupied by the post and a projection on the post adjacent the end, the recess in the ring being wider than the combined width of the post and projection and there being means to prevent longitudinal and lateral separation of the post and ring.

6. In a die stock of the character described, the combination of a rotary frame comprising an annular plate beveled adjacent the inner periphery and having a comparatively thin annular marginal portion adjacent its outer periphery and thickened between said bevel and marginal portion, and chaser housings formed on an intermediate annular region of said plate, by said plate and ribs upstanding therefrom and terminating at their outer ends substantially at the outer edge of said intermediate region so that the chaser may extend freely over the said marginal portion, the cavity of each housing being rectangular in cross section and having its base in substantially the same plane as the face of said marginal portion, the thickening of the annular plate being between the chaser housings, and means acting on the frame on the opposite side from said chaser housing for rotating the frame.

7. In a die stock, the combination of a frame comprising a plate-like portion with a screw threaded sleeve and a concentric flange extending from the same side of the plate-like portion, housings formed on the opposite side of the plate-like portion and having their chambers in communication with the annular space between said sleeve and flange, chasers occupying the housings, a cam ring between the sleeve and flange coacting with the chasers, teeth formed on the outer side of the flange, an operating ring embracing said teeth and having a ratchet pawl adapted to coact therewith, and means carried by the flange for holding the cam ring and the operating ring movably in place.

8. In a die stock, the combination of a chaser carrying frame having an annular plate-like portion with a sleeve carrying a lead screw adapted to engage a work holder and with an annular flange concentric of the lead screw sleeve and on the same side of the plate-like portion to provide an annular recess open toward the work holder, a cam ring mounted in said recess and a locking ring secured to the flange and entering the recess on the back face of the cam for holding the cam ring in place.

9. In a die stock, the combination of a work holder, a chaser frame having a threaded sleeve engaging the work holder and having chaser housings on the opposite face from the sleeve, the chasers occupying said housings, a cylindrical flange carried by the chaser frame and extending toward the work holder, a cam ring mounted against the frame on the opposite side of the frame from the chasers and outside of the lead screw and inside of said cylindrical flange and having a scroll connection with the chasers, means secured to said flange for holding the cam ring movably in place, an inclined post rigidly mounted on the cam ring and extending away from the face of the ring opposite the scroll, and a rotary ring mounted on the work holder and having a shoulder engaged by the inclined post.

10. In a die stock of the character described, the combination of a work holder, a chaser frame having a lead screw connection therewith, a cylindrical flange carried by the chaser frame extending toward the work holder, a cam ring housed between the flange and lead screw sleeve and connected with chasers mounted in housings carried on the opposite face of the frame, a retaining device carried by the flange and extending into the recess between the lead screw and flange and bearing against the cam ring, an inclined recession post carried by the cam ring and a ring on the work holder with which said inclined post has a slidable connection.

ROBERT B. PEALER.